United States Patent
Eatedali et al.

(10) Patent No.: US 11,112,266 B2
(45) Date of Patent: Sep. 7, 2021

(54) METHOD FOR MOTION-SYNCHRONIZED AR OR VR ENTERTAINMENT EXPERIENCE

(71) Applicant: Disney Enterprises, Inc., Burbank, CA (US)

(72) Inventors: Josiah Eatedali, Los Angeles, CA (US); James P. Madden, Studio City, CA (US); Mark Arana, Agoura Hills, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 520 days.

(21) Appl. No.: 15/042,543

(22) Filed: Feb. 12, 2016

(65) Prior Publication Data
US 2017/0236328 A1 Aug. 17, 2017
US 2018/0033199 A9 Feb. 1, 2018

(51) Int. Cl.
*G01C 21/36* (2006.01)
*H04L 29/08* (2006.01)

(52) U.S. Cl.
CPC ..... *G01C 21/3697* (2013.01); *G01C 21/3688* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 8,838,384 B1* | 9/2014 | Daily | G01C 21/3629 340/988 |
| 2006/0105838 A1* | 5/2006 | Mullen | A63F 13/00 463/31 |
| 2016/0110615 A1* | 4/2016 | Weller | G02B 27/0103 348/115 |
| 2016/0363992 A1* | 12/2016 | Welti | G06F 3/012 |
| 2017/0072316 A1* | 3/2017 | Finfter | A63F 13/26 |
| 2017/0103571 A1* | 4/2017 | Beaurepaire | G01C 21/3667 |

* cited by examiner

*Primary Examiner* — Yingchun He
(74) *Attorney, Agent, or Firm* — Dorsey & Whitney LLP

(57) ABSTRACT

Systems and methods for synchronizing movement, such as the movement of a vehicle with an augmented reality (AR) or virtual reality (VR) story-telling or narrative experience is provided. For example, the AR or VR experience can be adapted to justify the movement of the vehicle based on trip criterion, such as a navigational path upon which the vehicle has embarked. Alternatively, trip criterion, such as the navigational path upon which the vehicle will embark, can be adapted to comport with one or more events of the AR or VR experience.

23 Claims, 7 Drawing Sheets

PRESENT SIMULATED AUDIO/VISUAL (A/V) EXPERIENCE TO A PASSENGER OF A VEHICLE
100

OBTAIN TRIP CRITERION RELEVANT TO THE VEHICLE
102

ADAPT THE SIMULATED A/V EXPERIENCE BASED UPON THE TRIP CRITERION
104

METHOD FOR MOTION-SYNCHRONIZED AR OR VR ENTERTAINMENT EXPERIENCE

TECHNICAL FIELD

The present disclosure relates generally to augmented reality (AR)/virtual reality (VR) presentations.

DESCRIPTION OF THE RELATED ART

VR can refer to the creation of a fully immersive virtual world/space experience that users may interact with. AR can refer to the blending of VR elements and real life. For example, AR may involve providing a live displayed experience of a physical, real-world environment in which the real-world elements are augmented by computer-generated sensory input.

BRIEF SUMMARY OF THE DISCLOSURE

In accordance with one embodiment, a computer-implemented method comprises presenting a simulated audio/visual (A/V) experience to a passenger of a vehicle. The computer-implemented method further comprises obtaining trip criterion relevant to the vehicle. Further still, the computer-implemented method comprises adapting the simulated A/V experience based upon the trip criterion.

In accordance with another embodiment, a computer-implemented method comprises receiving information regarding a simulated audio/visual (A/V) experience. The computer-implemented method further comprises generating at least one of trip criterion and ride information to comport with one or more events of the simulated A/V experience. Moreover, the computer-implemented method comprises presenting the simulated A/V experience in conjunction with the at least one of the trip criterion and ride information such that the at least one of the trip criterion and ride information corresponds to the simulated A/V experience.

In accordance with another embodiment, a system comprises a simulation device adapted to create a simulated augmented reality (AR) story-telling experience. The system further comprises at least one sensor adapted to at least one of generate and provide navigational and motion information associated with a vehicle through which the simulated AR experience is presented to the simulation device, and receive information regarding the simulated AR story-telling experience, wherein the simulated AR story-telling experience is synchronized with the navigational and motion information associated with the vehicle.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Transportation can be a tedious activity for children, teenagers, and even adults. An immersive entertainment experience provided during times that people are forced to spend going from one place to another, such as the morning commute to school in a car or bus, a long road-trip, etc. would help to alleviate the tedious nature of travel. Additionally, as self-driving cars and augmented/virtual reality becomes more pervasive, those technologies can be leveraged to create better story-telling experiences.

Accordingly, various embodiments integrate procedurally generated AR/VR creation with motion-based technologies (such as navigation, self-driving, and/or sensor-based technologies) to create an immersive story-telling environment. This can be accomplished by linking or synchronizing the actual motion of the vehicle and/or vehicle occupant(s) to what the vehicle occupant(s) sees on a screen and/or is projected onto a display or other viewing surface, such as a vehicle window (see FIG. 3A). As a result, any travel experience can be turned into an interactive narrative experience.

For example, a vehicle's motion-based system(s) can exchange trip criterion as well as ride information with an AR or VR creation system to generate one or more events justifying that trip criterion and/or ride information in the context of a story-telling experience. Alternatively, the AR or VR creation system can create a narrative or story-telling experience that can be shared with the vehicle's motion-based system(s). The vehicle's motion-based system(s) may then generate trip criterion to which the vehicle adheres such that the travel experience comports with the narrative or story-telling experience.

It should be noted that although various embodiments herein are presented and described in the context of a vehicle, the vehicle can simply be a mechanism through which AR or VR can be experienced. That is, the AR or VR creation system as well as one or more of the navigation, self-driving, and/or sensor systems can reside within a separate device, such as a smartphone, tablet PC, and the like.

Figure 1A:
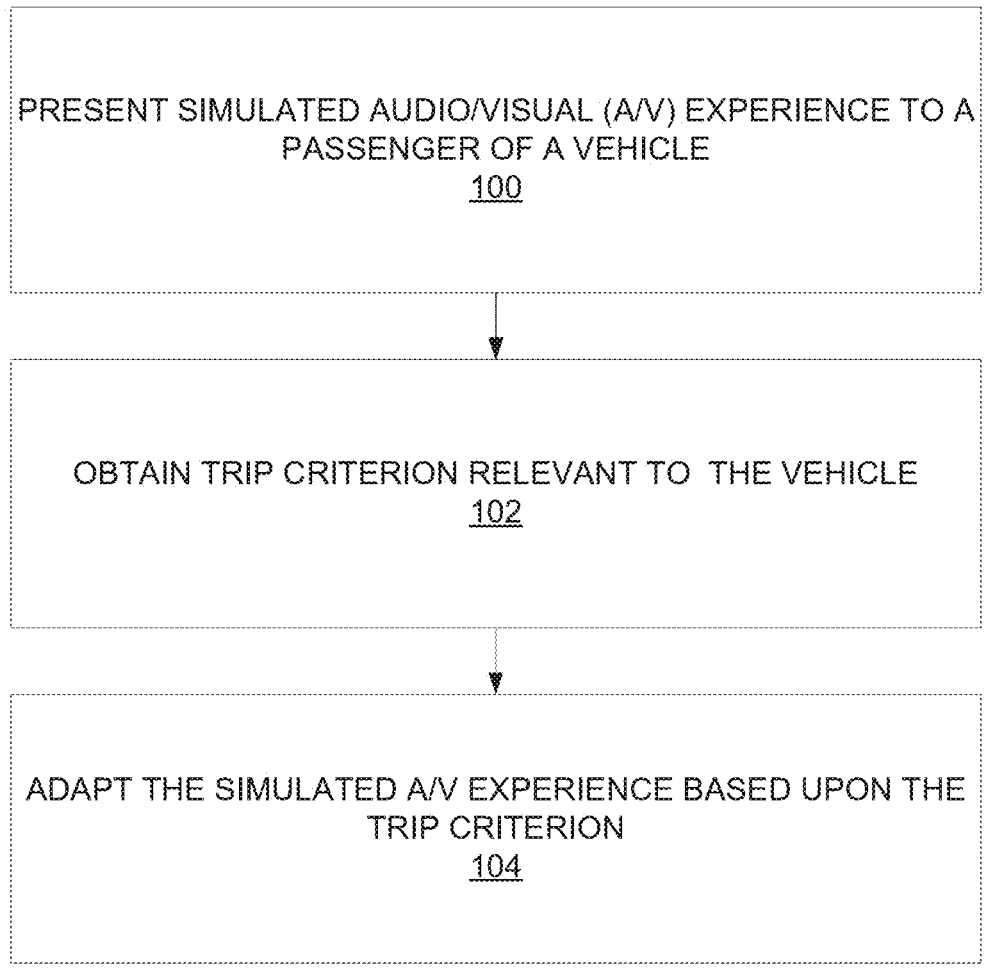
FIG. 1A is an operational flow diagram illustrating an example process for synchronizing a simulated AR or VR experience with motion in accordance with one embodiment.
Figure 1B:
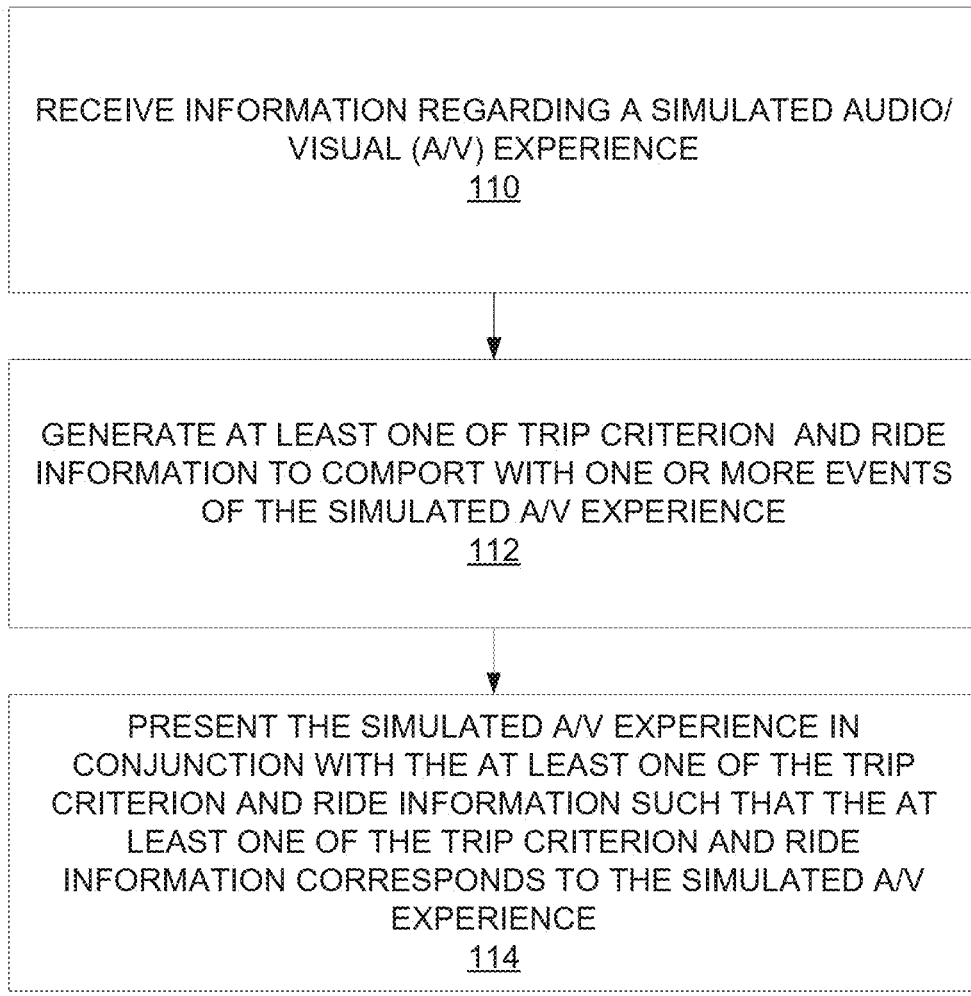
FIG. 1B is an operational flow diagram illustrating an example process for synchronizing a simulated AR or VR experience with motion in accordance with a second embodiment.
Figure 2A:
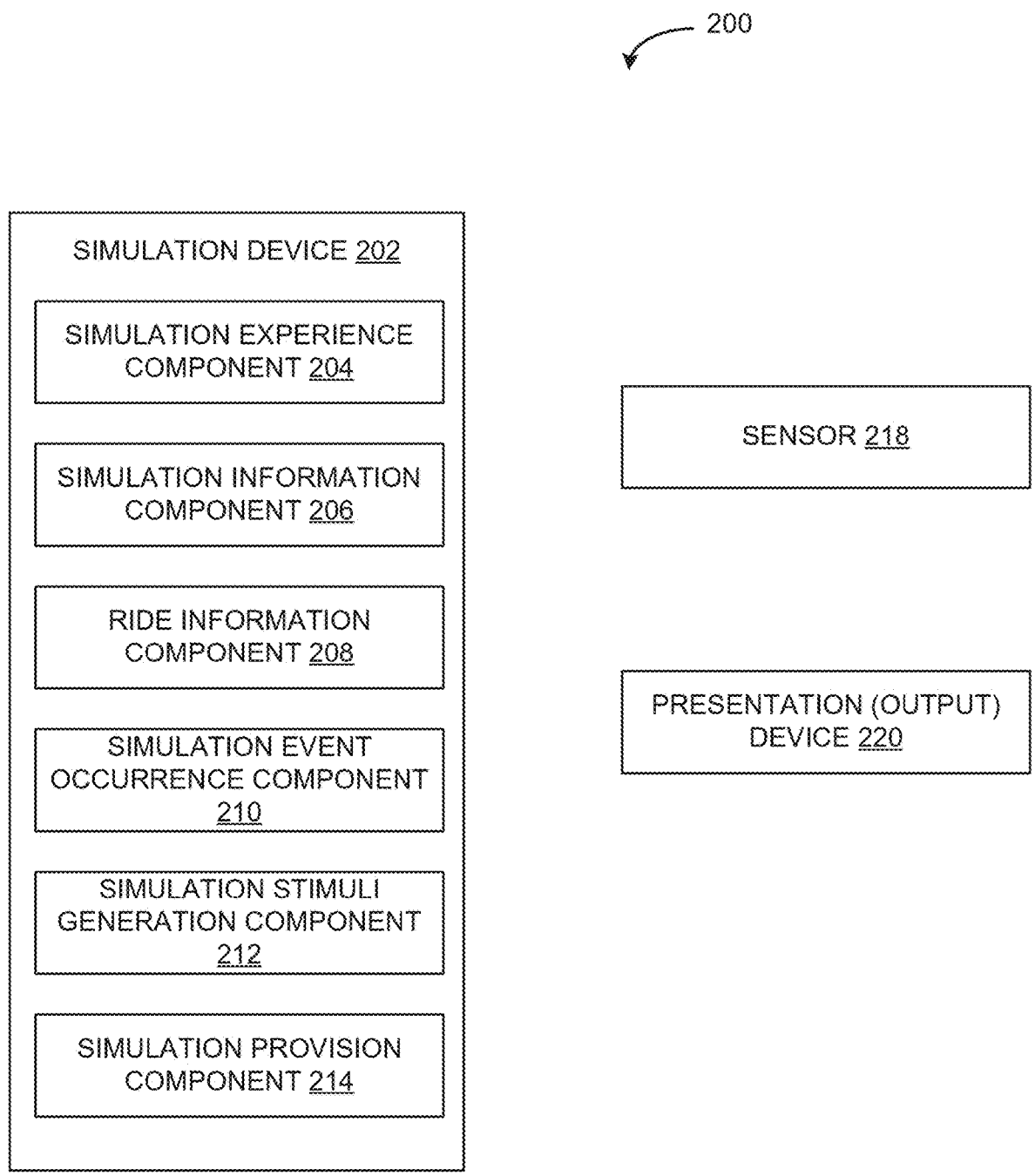
FIG. 2A illustrates an example motion-synchronized AR or VR experience system in accordance with various embodiments.
Figure 2B:
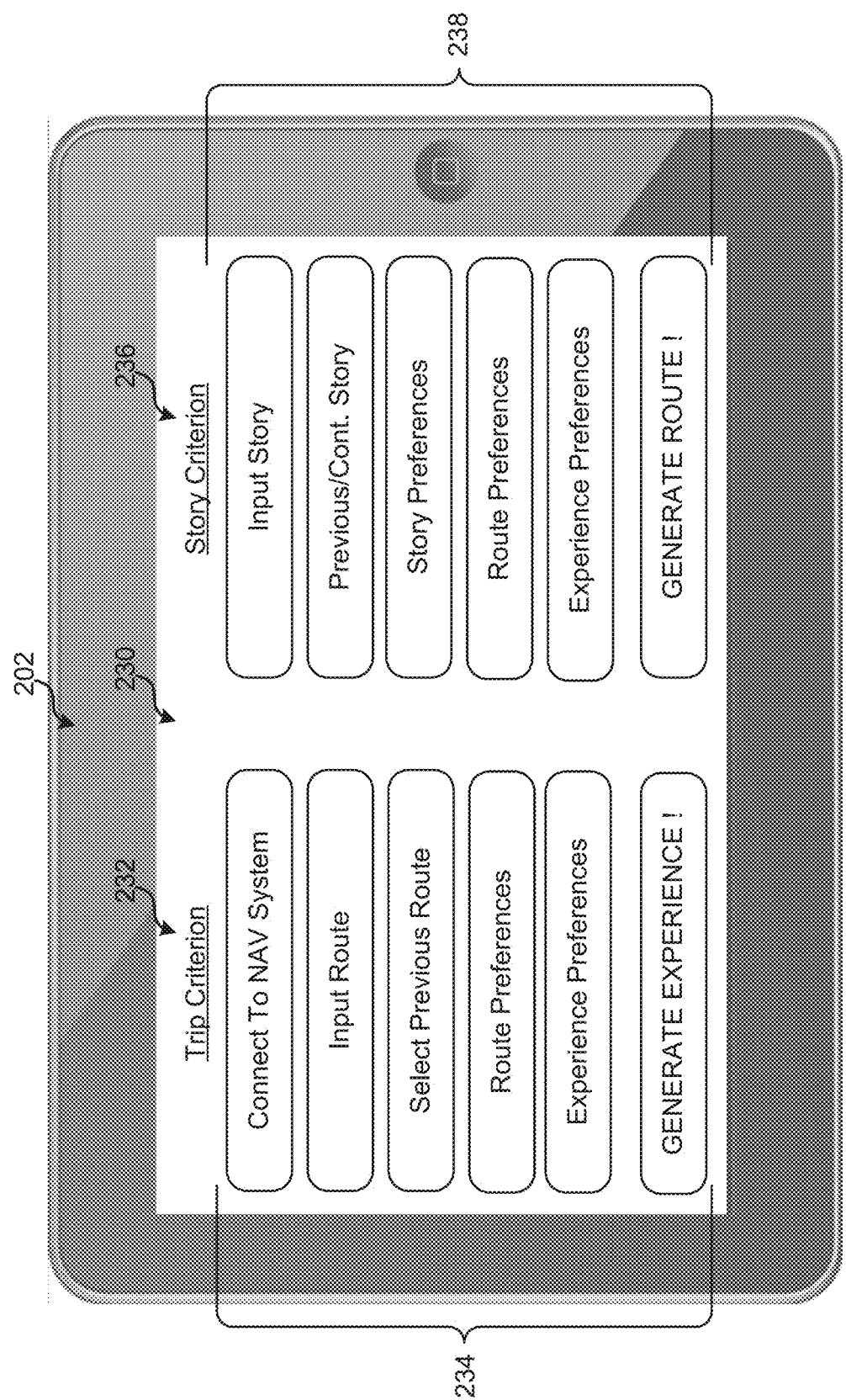
FIG. 2B illustrates an example interface through which one or more user inputs or selections can be received for generating a motion-synchronized AR or VR experience in accordance with various embodiments.

FIGS. 1A, 1B, 2A, and 2B will be described in conjunction with each other, where FIGS. 1A and 1B illustrate example processes performed in accordance with various embodiments for generating an AR or VR story-telling experience that is synchronized with vehicle movement. FIG. 2A is a block diagram of an example system providing a vehicle-synchronized AR or VR experience in accordance with various embodiments. FIG. 2B is a representation of an example interface through which one or more user inputs/ selections can be received for generating a motion-synchronized AR or VR experience in accordance with various embodiments.

At operation 100, a simulated audio/visual experience is presented to a passenger of a vehicle. A simulated A/V experience may refer to a simulated, recreational presentation conveyed to the vehicle passenger through various media. Such media may include one or more of visual, audio, haptic, and/or other media, where the visual, audio, haptic, and/or other media changes based on the motion of the vehicle as described in greater detail below. A simulated, recreational presentation may include the presentation of simulation content. The simulation content may include one or more of a story, an image, a video, a movie, an audio, a song, and/or other content. For example, a simulated experience may include a story relating to escaping zombies in a vehicle.

A vehicle may be any passenger conveyance, such as a bus, car, boat, glider, airplane, bicycle, motorcycle, etc. As alluded to previously, various embodiments are described in the context of a vehicle such as a car or bus, where the vehicle may have an associated motion-based system, for example, an in-vehicle navigation system. However, other embodiments do not require any vehicle-specific systems. Moreover, contemplated vehicles do not necessarily have to be embodied with particular physical characteristics, such as windows or in-vehicle entertainment systems. That is, a motion-synchronized AR or VR experience can be provided to a user having a device capable of providing an AR or VR experience, such as a head-mounted display, and a device (which may be the same or different from that providing the AR or VR experience) that can provide motion-based information such as trip criterion Presentation of the simulated A/V experience can be accomplished by a motion-synchronized AR or VR system 200, such as that illustrated in FIG. 2A. System 200 may include one or more of a simulation device 202, a sensor 218, and a presentation (output) device 220. Some or all components of system 200 may be installed in a vehicle and/or coupled with a vehicle. Some or all components of system 200 may be worn or held by a person. Some or all of components of system 200 may be installed in a device worn by a person in a vehicle and/or be otherwise coupled with a device worn by a person in a vehicle.

Presentation (output) device 220 may be configured to provide a simulation experience visually, audibly, haptically, and/or in other ways. Presentation device 220 may include one or more of a display, a speaker, a light source, an air conditioner, a heater, a temperature controller and/or other simulation devices.

A display may provide a simulation experience through visual information presented on the display. Visual information may include information that may be observed visually, such as an image, video, and/or other visual information. A display may include one or more of an optical head-mounted display 308 (see FIG. 3B), a head-mounted display 310 in which simulation device 202 (or alternatively, presentation device 220) may be integrated (see FIG. 3C), a see-through display, an optical see-through display, a video see-through display, a visor, eyeglasses, sunglasses, a computer, a laptop, a smartphone, a tablet, a mobile device, a projector, and/or other displays.

In some implementations, a display may include motion, position, and/or orientation tracking component, so that the visual information presented on the display changes as the position and/or orientation of the display changes. In some implementations, a display may be integrated with a vehicle. For example, a display may include one or more of a dashboard display, a global positioning system (GPS) navigation display, a front view camera display (see FIG. 3A), a rear view camera display, a display of a vehicle entertainment system and/or other displays such as a heads-up display projected on a window of the vehicle.

A display may be configured to display a simulation experience using AR or VR technology. For example, a display may visually provide the simulation experience by displaying an overlay image over one or more of an image, a video, and/or other visual information so that one or more parts of a real-world objects appear to be augmented by one or more parts of a virtual-world objects. In some implementations, a display may use AR or VR technology to display a simulation experience by using systems and methods described in U.S. patent application Ser. No. 14/966,754, entitled "SYSTEMS AND METHODS FOR AUGMENTING AN APPEARANCE OF AN ACTUAL VEHICLE COMPONENT WITH A VIRTUAL VEHICLE COMPONENT," filed Dec. 11, 2015, the foregoing being incorporated herein by reference in its entirety. Other systems and methods of providing a simulation experience are contemplated.

A speaker may provide a simulation experience through audio information generated by the speaker. Audio information may include information that may be observed audibly. Audio information may include one or more of sound, vibration and/or other audio information. A speaker may include one or more of a headphone, an earphone, a headset, an earset, and/or other speakers. In some implementations, a speaker may include a speaker associated with a display. For example, a speaker may include a speaker of a mobile device. In some implementations, a speaker may be integrated with a vehicle. For example, a speaker may include a sound system of a vehicle.

A light source may provide a simulation experience through one or more wavelengths and/or intensities of light. A light source may include an electric lighting, a fluorescent lighting, an incandescent lighting, an infrared lighting, a light-emitting diode, and/or other light sources. In some implementations, a light source may include a light source of a mobile device. In some implementations, a light source may be integrated with a vehicle. For example, a light source may include one or more interior light sources of a vehicle.

Referring back to FIG. 1A, trip criterion relevant to the vehicle is obtained. A trip criterion may refer to one or more physical and/or temporal characteristics of a trip. By way of example, a trip criterion may include, but is not limited to, one or more information relating to the trip destination, the distance of the trip, the duration of the trip, the path to a trip destination, the locations along the trip, and/or other information relating to the trip. A trip criterion may be obtained based on one or more user inputs received through one or more input devices, and/or from one or more navigation devices.

At operation 104, the simulated A/V experience is adapted based upon the trip criterion such that the simulated A/V experience justifies the trip criterion. That is, simulation device 202 would adapt the simulated A/V experience to include, e.g., a story experience, element, event, or action, that would be justified in the narrative. To accomplish this synchronization between motion and the simulated AR or VR experience, simulation device 202 may be configured to execute one or more computer program components. The computer program components may include one or more of a simulation experience component 204, a simulation information component 206, a ride information component 208, a simulation event occurrence component 210, a simulation stimuli generation component 212, a simulation provision component 214, and/or other components.

Simulation experience component 204 may be configured to select a simulated experience or overall story theme or narrative. A simulation experience may be selected based on a trip criterion. It should be noted that a simulation experience may also be selected based upon a user selection, a prior simulated experience, and/or other information. Simulation experience component 204 may include or retrieve information (for example, a database, etc.) that matches one or more of a trip criterion, a user selection, a prior simulated experience, and/or other information relating to a particular simulation experience.

In some implementations, simulation experience component 204 may select a simulated experience based on a trip destination. For example, simulation experience component 204 may match a trip destination of a home to a simulation experience relating to space travel to a home base, a home planet, or a home ship as part of the narrative presented in the simulated AR or VR experience. In some implementations, simulation experience component 204 may select a simulated experience based on a distance of a trip. A distance of a trip may refer to a distance of one or more parts of the trip. For example, simulation experience component 204 may match a short distance of a trip to a simulation experience relating to a space race to a nearby object/location. In some implementations, simulation component 204 may select a simulation experience so that a story of the simulation experience reaches its peak when the vehicle is estimated to be at a certain location in the trip. For example, simulation experience component 204 may select a simulation experience so that a story of the simulation experience will reach its peak when the vehicle is expected to have traveled a certain percentage (e.g., 70%) of the distance of the trip.

In some implementations, simulation experience component 204 may select a simulated experience based on a duration of a trip. A duration of a trip may refer to a duration of one or more parts of a trip. For example, simulation experience component 204 may match a long duration of a trip to a simulation experience relating to a long space battle. In some implementations, simulation component 204 may select a simulation experience so that a story of the simulation experience reaches its peak when the vehicle is estimated to have a certain duration remaining in the trip.

In some implementations, simulation experience component 204 may select a simulated experience based on a location along a trip. A location along a trip may refer to a location along one or more parts of a trip. As non-limiting examples, simulation experience component 204 may match an urban area along a trip to a simulation experience in a virtual city.

In some implementations, a trip criterion may be obtained from one or more navigation systems or devices. A navigation device may refer to a device that keeps track of a location of a vehicle on a trip. For example, a navigation device may include a navigation/GPS system of a vehicle and/or a navigation/GPS system coupled to simulation device 202. As another example, a navigation device may include or be implemented in a mobile device such as a smart phone. Simulation experience component 204 may obtain, from one or more navigation devices, one or more of a trip destination, a distance of a trip, a duration of a trip, a location along a trip, a path along the trip or to the trip destination, and/or other information relating to a trip.

A simulation experience may also be selected based on a user selection. FIG. 2B illustrates an example user interface 230 through which one or more user inputs/selections 234 may be received. The example user interface 230 may be presented on simulation device 202 or other devices. Various options can be presented to allow a user to tailor the experience to his/her desires or needs. As discussed herein, an AR or VR experience can be generated such that is corresponds to or justifies one or more events that may occur over the course of a route to a particular destination. To achieve this synchronization, the user, through the selection of trip criterion 232 may opt to connect to a navigation system, input a route, or select a previously traveled route. The user may further specify one or more preferences, whether applicable to a particular route or related to the user's experience, such as how immersive the user desired the AR or VR experience to be.

A user selection may include a selection of a simulation experience based on one or more user inputs received through one or more input devices. A simulation experience may alternatively be selected based on a prior simulated experience. A prior simulated experience may refer to one or more simulated experiences previously presented to a user. Information regarding a prior simulation experience may be obtained from a memory of system 200 and/or a memory otherwise coupled to system 200. For example, information regarding a prior simulation experience may indicate that the prior simulation experience was not concluded. In some implementations, simulation component 204 may select the prior simulated experience and continue the presentation of that prior simulation experience.

Simulation Information component 206 may be configured to obtain simulation information for the simulation experience. The simulation information may include one or more of a database, a lookup table, and/or other information component that allows simulation information component 206 to match a simulation event to a simulation stimulus. A simulation event may refer to one or more of specific motions, specific actions, specific sounds, specific locations, specific surroundings, and/or other specific conditions relating to a vehicle and/or a person in the vehicle. A simulation stimulus may refer to one or more of a visual, an audio, a haptic and/or other simulation that may change a simulation experience. The simulation information may be programmed into simulation information component 206, updated by simulation information component 206, obtained by simulation information component 206 from electronic storage, obtained by simulation information component 206 from a remote location, and/or obtained by simulation information component 206 in other ways.

The simulation information may include simulation stimuli that correspond to simulation events. The simulation stimuli may include a first simulation stimulus that corresponds to a first simulation event. For example, a particular simulation stimulus (e.g., a virtual vehicle jumping into light speed/a virtual vehicle hitting an obstacle) may correspond to a particular motion of a vehicle (e.g., accelerating/braking). As another example, a particular simulation stimulus (e.g., a virtual location shaking and/or virtual objects falling/moving) may correspond to a particular activity inside a vehicle (e.g., high volume and/or intensity of physical activity inside a vehicle). As another example, a particular simulation stimulus (e.g., the size, shape, and/or angle of a virtual object changing and/or specific actions taken by a virtual object, such as communicating or firing a weapon) may correspond to a particular location of a vehicle (e.g., distance from a destination or duration to a destination). As another example, a particular simulation stimulus (e.g., virtual rain in a virtual location) may correspond to a particular environment around a vehicle (e.g., rain). Other simulation stimulus and simulation events are contemplated.

Ride information component 208 may be configured to obtain ride information. Ride information may characterize one or more aspects of a ride. The aspects of the ride may include a setting of the ride, operation of the vehicle, user interaction or reaction within the vehicle, and/or other aspects. Without limitation, ride information may include motion, action, sound, location, surroundings, and/or other information relating to a vehicle and/or a person in the vehicle. Ride information may be obtained from output signals generated by sensor 218.

Sensor 218 may include one or more of image sensors, temperature sensors, vehicle speed sensors, wheel speed sensors, motion sensors, accelerometers, tilt sensors, inclination sensors, angular rate sensors, gyroscopes, navigation sensors, geolocation sensors, magnetometers, radar detectors, radar sensors, proximity sensors, distance sensors, vibration sensors, light detection sensors, vehicle sensors, engine control module sensors, and/or other sensors. In some implementations the aforementioned navigation system/device may be thought of or embodied as a sensor). In some implementations, sensor 218 may be installed in a vehicle and/or be otherwise coupled to a vehicle. In some implementations, sensor 218 may be worn by a person in a vehicle. In some implementations, sensor 218 may be installed in or otherwise coupled to simulation device 202.

Ride information may include motion information. Motion information may characterize a motion experience by a person in a vehicle at a time, over a duration of time, at a location, or over a distance. Motion information may include one or more information regarding motion experienced by a person in a vehicle, including one or more of moving forward, moving backwards, moving right, moving left, moving up, moving down, turning left, turning right, sloping up, sloping down, acceleration in any direction and/or angle, deceleration in any direction and/or angle, jostling, hitting a speedbump, hitting a pothole, and/or other motion information. Simulation device 202 may obtain motion information from output signals generated by sensor 218. In some implementations, sensor 218 may include one or more of a vehicle speed sensor, a wheel speed sensor, a motion sensor, an accelerometer, a tilt sensor, an inclination sensor, an angular rate sensor, a gyroscope, a magnetometer, a vibration sensor, a vehicle sensor, an engine control module sensor, and/or other sensors.

In some implementations, ride information may include activity information. Activity information may characterize an action performed and/or a sound made by a person or other object in a vehicle at a time, over a duration of time, at a location, or over a distance. Activity information may include one or more information regarding activity of a person in a vehicle, including one or more of quantity and/or quality of action and/or sound made by the person, and/or other activity information. Simulation device 202 may obtain activity information from output signals generated by sensor 218. In some implementations, sensor 218 may include one or more of an image sensor that characterizes an action performed by a person in the vehicle, a sound sensor that characterizes a sound made by a person in the vehicle, a wearable sensor that characterizes an action performed and/or a sound made by a person in the vehicle, and/or other sensors. Moreover, sensor 218 may also be used to customize or personalize presentation of the simulated A/V experience to the user or users in accordance with various embodiments based on activity information. For example, in vehicle with multiple windows, presentation of one or more AR or VR elements may be optimized for the best viewing angle by the user or users in the vehicle.

In some implementations, ride information may include trip progress information. Trip progress information may characterize a location of a vehicle along a trip, a distance traveled in a trip, a distance remaining in a trip, a duration traveled in a trip and/or a remaining expected duration of a trip. Trip progress information may include one or more information regarding a status of a trip, including one or more of location of a vehicle, a traveled distance, a remaining distance, a traveled duration, an expected remaining duration, and/or other trip progress information. Simulation device 202 may obtain trip progress information from output signals generated by sensor 218. In some implementations, sensor 218 may include one or more of a navigation sensor, a geolocation sensor, a magnetometer, a vehicle sensor, an engine control module sensor, and/or other sensors.

In some implementations, ride information may include environment information. Environment information may characterize a condition of an environment around a vehicle at a time, over a duration of time, at a location, or over a distance. Environment information may include one or more of information regarding a condition of an environment around a vehicle, including one or more of time, weather, temperature, humidity, lighting, and/or other environment information. Simulation device 202 may obtain environment information from output signals generated by sensor 218. In some implementations, sensor 218 may include one or more of a clock, an image sensor, a temperature sensor, a vibration sensor, a light detection sensor, a vehicle sensor, an engine control module sensor, and/or other sensors. In some implementations, simulation device 202 may obtain environment information by determining a location of a vehicle from output signals generated by sensor 218 and obtaining environment information at the location from a communication device.

Simulation event occurrence component 210 may be configured to identify occurrences of simulation events based on ride information. A simulation event may refer to one or more of specific motions, specific actions, specific sounds, specific locations, specific surroundings, and/or other specific conditions relating to a vehicle and/or a person in the vehicle. Occurrences of simulation events may be identified based on one or more of motion information, activity information, trip progress information, environment information, caravanning information, and/or other ride information. Simulation event occurrence component 210 may be configured to identify an occurrence of a simulation event when one or more of motion information, activity information, trip progress information, environment information, and/or other ride information indicates occurrence of one or more of specific motions, specific actions, specific sounds, specific locations, specific surroundings, and/or other specific conditions relating to a vehicle and/or a person in the vehicle that correspond to a specific simulation event.

Criteria for an occurrence of one or more simulation events may be referred to as a simulation event logic. The simulation event logic may be programmed into simulation event occurrence component 210, updated by simulation event occurrence component 210, obtained by simulation event occurrence component 210 from the simulation information, obtained by simulation event occurrence component 210 from memory, obtained by simulation event occurrence component 210 from a remote location, and/or obtained by simulation event occurrence component 210 in other ways.

Simulation stimulation generation component 212 may be configured to generate simulation stimuli that correspond to simulation events for which occurrences are identified. A simulation stimulus may refer to one or more of a visual, an audio, a haptic and/or other simulation that may change a simulation experience. Simulation stimulation generation component 212 may be configured to generate a simulation stimulus for a simulation event when the simulation stimulus corresponding to the simulation event is found in the simulation information.

Simulation provision component 214 may be configured to effectuate provision of a simulated experience by operating simulation device presentation (output) device 220. Presentation (output) device 220 may include one or more of a display, a speaker, a light source, an air conditioner, a heater, a temperature controller and/or other simulation devices. Simulation provision component 214 may be configured to effectuate provision of a simulated experience through one or more of visual, audio, haptic and/or other simulation, where the visual, audio, haptic, and/or other simulation changes based on simulation stimuli.

Figure 3A:
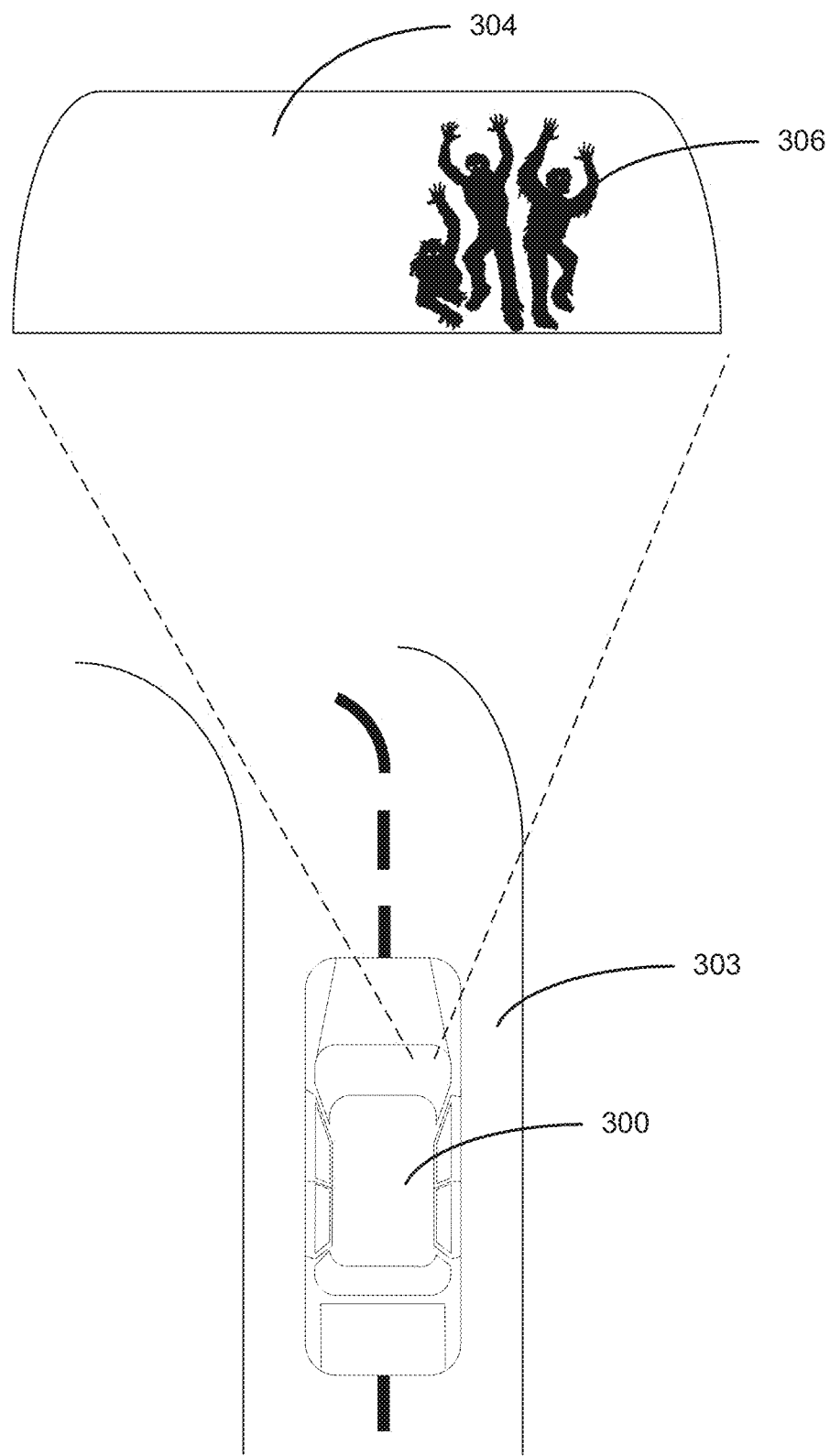
FIG. 3A illustrates an example event occurring in a motion-synchronized AR or VR experience in accordance with a first implementation.
Figure 3B:
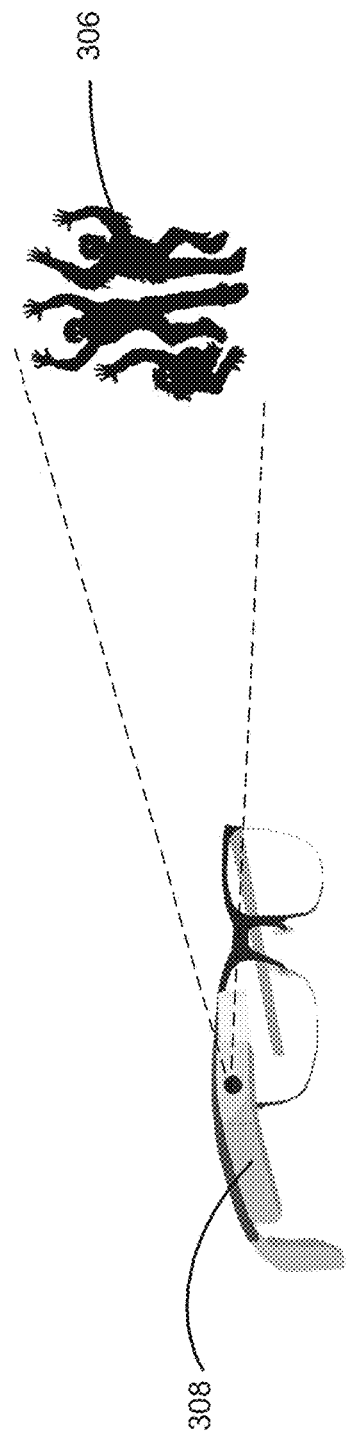
FIG. 3B illustrates the example event of FIG. 3A presented with an alternative device in accordance with a second implementation.
Figure 3C:
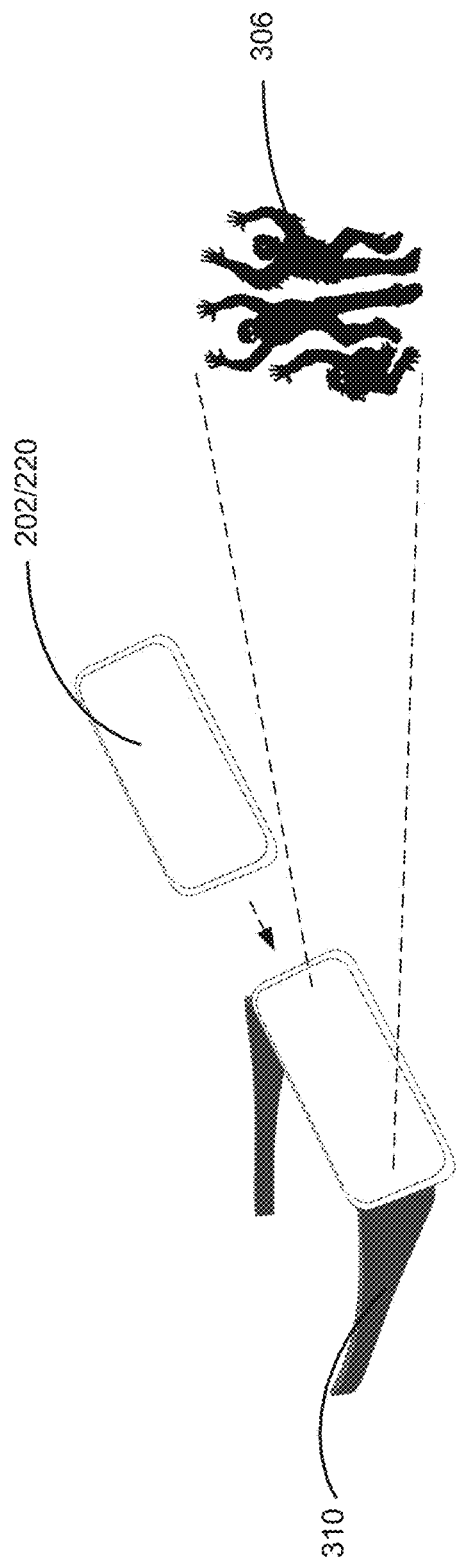
FIG. 3C illustrates the example event of FIG. 3A presented with an alternative device in accordance with a third implementation.

For example, FIG. 3A illustrates a motion-synchronized simulated AR or VR experience provided by system 200. In FIG. 3A, the simulation experience relates to escaping zombies in a virtual post-apocalyptic world. In this example, simulation event occurrence component 210 may select a simulated experience based upon one or more aspects along the path to the trip destination gleaned from trip criterion obtained from sensor 218. Simulation event occurrence component 204 may match navigational turns along the identified path to evade zombies. It may be determined (also by sensor 218) that the optimal display of the AR zombies 306 to be avoided is on the front windshield 304 of vehicle 300. Prior to where the trip criterion (and/or ride information) indicates that vehicle 300 should complete a left turn on road 302, AR zombies are presented to the vehicle passenger. In this example, presentation device 220 may be a heads-up display projector projecting images of the AR zombies 306 on front windshield 304. Thus, the left turn would be justified in the narrative of escaping zombies.

It should be noted that the number and/or timing of aspects chosen can vary. Simulation event occurrence component 210 can be configured and/or optimized to identify and select simulated events based on any of the aforementioned criteria/considerations (see FIG. 2B). For example, based on the duration of a trip, the number of simulated events can be increased or decreased. Moreover, a user may be able to select how immersive the simulated AR or VR experience should be, whether more immersive, i.e., more simulated event occurrences are presented, or less immersive, i.e., less simulated event occurrences are presented. Additionally, the timing of the presentation of AR events or activities can also be configured. For example, simulation event occurrence component 210 can be configured to present AR events or activities 2, 3, 5, 10 seconds before, or substantially at the time an actual trip event or action in the trip criterion or ride information is to occur. Moreover, one or more components of simulation device 202 can be configured to update their respective simulation processes based on changes in traffic/environmental conditions. Additionally still, input from one or more users can cause the one or more components of simulation device 202 to adapt and/or adjust the trip criterion and/or ride information accordingly.

In accordance with another embodiment, instead of justifying trip criterion and/or ride information with the simulated AR or VR experience (i.e., synchronizing the AR or VR experience to the trip), the narrative or story of the simulated AR or VR experience can influence the trip criterion/ride information. For example, a story or narrative to be presented via a simulated AR or VR experience can be developed with certain pre-determined events that require a kinetic response. For example, a narrative where a vehicle engine stalls may require the actual vehicle to slow down and stop.

Accordingly, simulation device 202 and its respective components can act in reverse. For example, a digital representation of the narrative may be input into simulation device 202. Referring to FIG. 1B, at operation 110, information regarding a simulated A/V experience is received. The various components, e.g., simulation experience component 204, simulation information component 206, ride information component 208, simulation event occurrence component 210, simulation stimuli generation component 212, and/or simulation provision component 214 may parse the digital representation of the narrative.

Parsing the digital representation of the narrative is done to obtain relevant information that may then be used to direct one or more of sensors 218 (e.g., the in-vehicle navigation system) and presentation device 220 to react accordingly. Referring again to FIG. 1B, at operation 112, at least one of trip criterion and ride information is generated to comport with one or more events of the simulated A/V experience. In response, the navigation system, for example, finds an appropriate place to slow down and stop to correspond to the narrative. If nothing is available, the simulation device 202 may update or adapt the narrative to match actual environmental conditions. It should be noted that system 200 can act in real-time, near real-time, or provide the narrative prior to the trip so that a route can be pre-plotted via the in-vehicle navigation system, for example. Thus, at operation 114, the simulated A/V experience can be presented in conjunction with the at least one of the trip criterion and ride information such that the at least one of the trip criterion and the ride information justifies the simulated A/V experience.

FIG. 2B illustrates the ability of the user to enter story criterion 236 using one or more options/selections 238 through user interface 230. In a scenario where the user wishes to tailor a trip to a pre-established story or narrative, the user may input a story or narrative, select/continue a previous AR or VR story experience, and enter story preferences. For example, the user may select only certain aspects of a story to which a generated trip or route should correspond. Similar to the previous embodiment, the user may enter or select route preferences and experience preferences to further customize and/or enhance the AR or VR experience.

Many different applications are contemplated herein. Various embodiments can be leveraged in amusement parks with the busses or monorail systems turning transportation into entertainment. For example, a customer being picked up by a bus could start an AR or VR experience (which could be unique based on their seat/window or a shared experience with the rest of the passengers, as well as a voluntary option requiring activation by the customer). Moreover, and in the case of multiple passengers, the AR or VR experience can be customized to each of the multiple passengers and/or shared depending upon variables such as where each particular passenger is seated/how they are oriented, consumption of prior AR or VR experiences, personal preferences relating to media presented in the AR or VR experience, etc. Users looking out the window of the bus may see a star scape as if they were in space, and as the bus accelerates, be presented with the visuals and sounds of accelerating into lightspeed. Simulation device 202 would then receive information relating to stops (either before or as they happen) and generate battles and asteroids that justify those movements along the drive from the parking lot to the park. These stories could either be stand-alone stories or linked together (e.g., contextually) like episodes to form longer term story telling experiences that may also be updatable based upon what the customer(s) may have previously experienced. It should be noted that in the case of multiple users/passengers, a single system 200 may be utilized, where sensor 218 can be responsible for acquiring information about each user/passenger, or multiple instances of system 200 can be implemented in a vehicle.

Figure 4:
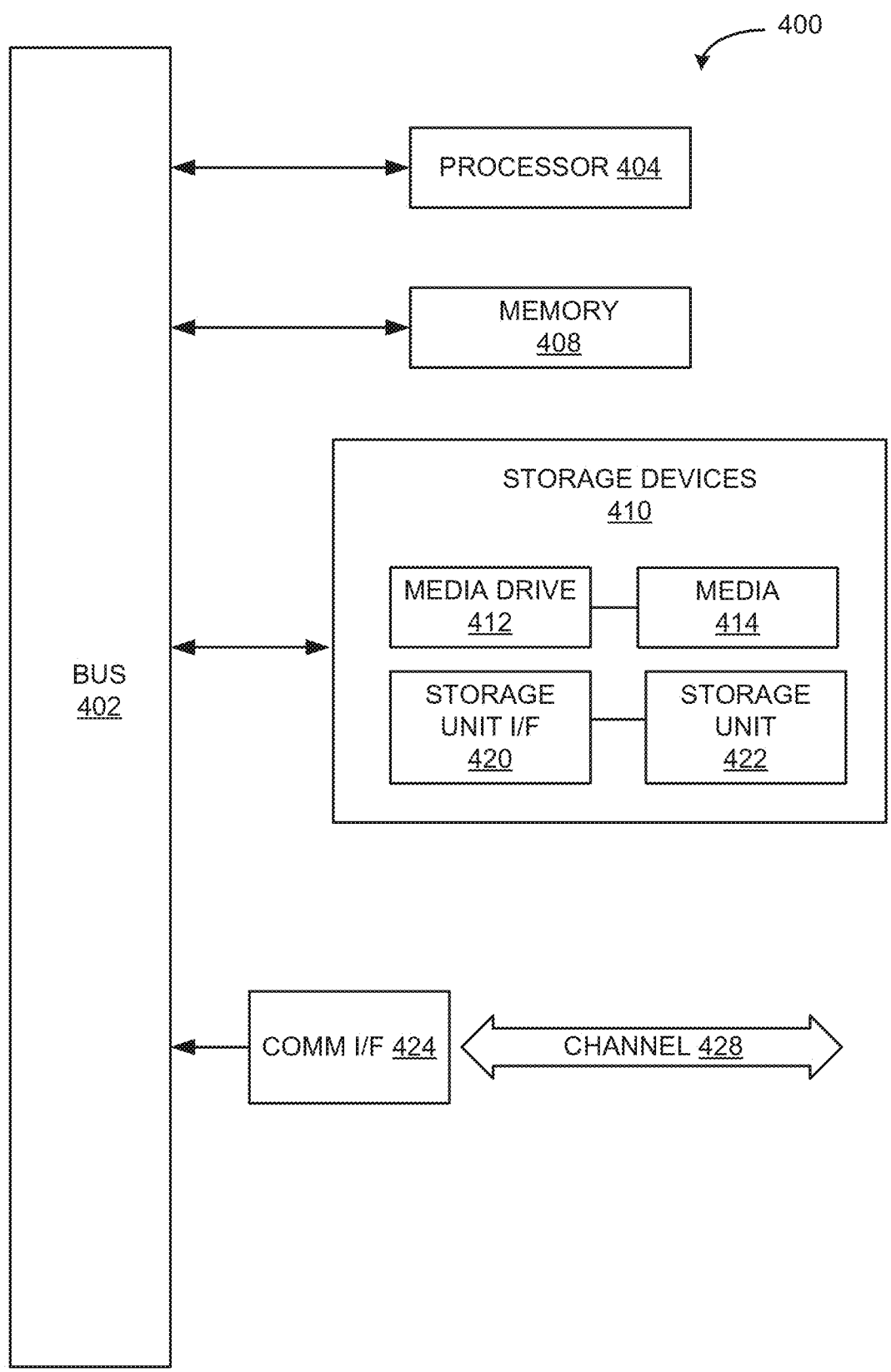
FIG. 4 is an example computing module that may be used to implement various features of embodiments described in the present disclosure.

FIG. 4 illustrates an example computing module that may be used to implement various features of the system and methods disclosed herein, for example, one or more elements of system 200, such as simulation device 202, and presentation (output) device 220.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 4. Various embodiments are described in terms of this example-computing module 400. After reading this description, it will become apparent to a person skilled in the relevant art how to implement the application using other computing modules or architectures.

Referring now to FIG. 4, computing module 400 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing module 400 might also represent computing capabilities embedded within or otherwise available to a given device. For example, a computing module might be found in other electronic devices such as, for example navigation systems, portable computing devices, and other electronic devices that might include some form of processing capability.

Computing module 400 might include, for example, one or more processors, controllers, control modules, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing module 400 or to communicate externally.

Computing module 400 might also include one or more memory modules, simply referred to herein as main memory 408. For example, preferably random access memory (RAM) or other dynamic memory, might be used for storing information and instructions to be executed by processor 404. Main memory 408 might also be used for storing temporary variables or other intermediate information during execution of instructions to be executed by processor 404. Computing module 400 might likewise include a read only memory ("ROM") or other static storage device coupled to bus 402 for storing static information and instructions for processor 404.

The computing module 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 414 might include, for example, a hard disk, an integrated circuit assembly, magnetic tape, cartridge, optical disk, a CD or DVD, or other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing module 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory module) and memory slot, a PCMCIA slot and card, and other fixed or removable storage units 422 and interfaces 420 that allow software and data to be transferred from the storage unit 422 to computing module 400.

Computing module 400 might also include a communications interface 424. Communications interface 424 might be used to allow software and data to be transferred between computing module 400 and external devices. Examples of communications interface 424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 408, storage unit 420, media 414, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 400 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method, comprising:
   determining a route of a vehicle from a starting point to a destination;
   presenting a simulated audio or visual (A/V) experience to a passenger of the vehicle;
   sensing ride information via a vehicle sensor directly coupled to the vehicle, the ride information corresponding to a motion of the vehicle as the vehicle travels along the route;
   obtaining a trip criterion relevant to the route;
   presenting a plurality of simulated event occurrences within the simulated A/V experience, wherein the simulated event occurrences are based on the ride information and the trip criterion;
   adapting the simulated A/V experience based upon the ride information and the trip criterion, wherein the simulated A/V experience comprises an augmented reality (AR) story-telling narrative; and
   receiving a passenger input selecting a quantity of simulated event occurrences, wherein a level of immersiveness of the simulated A/V experience is configured to be adjusted based on the selected quantity of simulated event occurrences.

2. The computer-implemented method of claim 1, wherein adapting the simulated A/V experience comprises presenting one or more AR elements in a context of the AR story-telling narrative configured to comport with one or more events identified in the trip criterion or the ride information.

3. The computer-implemented method of claim 1, wherein the trip criterion is obtained from at least one of a navigation system or the vehicle sensor.

4. The computer-implemented method of claim 3, wherein the trip criterion is obtained from at least the navigation system, and wherein the navigation system comprises one of an in-vehicle navigation system or a navigation system implemented remotely from the vehicle.

5. The computer-implemented method of claim 1, wherein adapting the simulated A/V experience comprises customizing the simulated A/V experience for the passenger based upon the ride information.

6. The computer-implemented method of claim 1, wherein the simulated A/V experience is one of plurality of simulated A/V experiences that are contextually linked.

7. The computer-implemented method of claim 1, wherein the ride information corresponds to a change in a condition of an environment external to the vehicle as the vehicle travels along the route.

8. The computer-implemented method of claim 7, wherein the condition comprises weather, temperature, humidity, lighting, or traffic.

9. The computer-implemented method of claim 7, wherein the vehicle sensor comprises a clock, an image sensor, a temperature sensor, a vibration sensor, a light detection sensor, a vehicle speed sensor, a wheel speed sensor, a motion sensor, an accelerometer, a tilt sensor, an inclination sensor, an angular rate sensor, a gyroscope, a navigation sensor, a geolocation sensor, a magnetometer, a radar sensor, a proximity sensor, a distance sensor, or an engine control module sensor, and the vehicle sensor is configured to sense the change in the condition.

10. The computer-implemented method of claim 1, wherein the route comprises a route along a road.

11. The computer-implemented method of claim 10, wherein the route comprises a commuting route.

12. The computer-implemented method of claim 1, wherein the simulated A/V experience is based on a prior simulated A/V experience.

13. The computer-implemented method of claim 1, wherein the vehicle includes a window and the computer-implemented method further comprises displaying the simulated A/V experience on the window.

14. The computer-implemented method of claim 1, further comprising adapting the simulated A/V experience based on a user position in the vehicle.

15. A computer-implemented method, comprising:
receiving information regarding a simulated audio or visual (A/V) experience;
generating a trip criterion and a ride information to comport with one or more events of the simulated A/V experience, wherein the ride information corresponds to a motion of a vehicle sensed by a vehicle sensor directly coupled to the vehicle; and
presenting a plurality of simulated event occurrences within the simulated A/V experience in conjunction with the trip criterion and the ride information;
adapting the simulated A/V experience based upon the ride information and the trip criterion, wherein the simulated A/V experience comprises an augmented reality (AR) story-telling narrative; and
receiving a passenger input selecting a quantity of simulated event occurrences, wherein a level of immersiveness of the simulated A/V experience is configured to be adjusted based on the selected quantity of simulated event occurrences.

16. The computer-implemented method of claim 15, wherein the AR story-telling narrative is developed with a pre-determined event requiring a kinetic response.

17. The computer-implemented method of claim 16, further comprising parsing a digital representation of the AR story-telling narrative to extract the pre-determined event.

18. The computer-implemented method of claim 16, further comprising adapting the simulated A/V experience in response to a determination that the at least one of the trip criterion or the ride information cannot meet at least one kinetic response requirement associated with the predetermined event.

19. The computer-implemented method of claim 15, wherein the trip criterion comprises a path to at least one destination.

20. A system, comprising:
a simulation device including a processor, wherein the processor is configured to create a simulated augmented reality (AR) story-telling narrative;
a viewing surface configured to present the AR story-telling narrative to a passenger of a vehicle;
a sensor configured to generate and provide navigational information associated with the vehicle to the simulation device, wherein the processor is further configured to:
generate a simulated audio or visual (A/V) experience based on the navigational information in a context of the AR story-telling narrative,
present a plurality of simulated event occurrences within the simulated A/V experience, wherein the simulated event occurrences are based on a motion of the vehicle due to an external element sensed by a vehicle sensor directly coupled to the vehicle;
adapt the simulated A/V experience based on the motion of the vehicle due to the external element sensed by the vehicle sensor to generate an adapted simulated A/V experience,
receive a passenger input selecting a quantity of simulated event occurrences, wherein a level of immersiveness of the simulated A/V experience is configured to be adjusted based on the selected quantity of simulated event occurrences; and
display the adapted simulated A/V experience to the passenger.

21. The system of claim 20, wherein the adapted simulated A/V experience justifies the navigational information.

22. The system of claim 20, wherein the processor is further configured to customize the simulated AR story-telling narrative based on a variable associated with the passenger.

23. The system of claim 20, wherein the simulated AR story-telling narrative is a portion of a broader story-telling experience.

* * * * *